(12) United States Patent
Yang et al.

(10) Patent No.: US 12,148,450 B2
(45) Date of Patent: Nov. 19, 2024

(54) VIDEO DISPLAY METHOD, ELECTRONIC DEVICE AND MEDIUM

(71) Applicant: VIVO MOBILE COMMUNICATION CO., LTD., Guangdong (CN)

(72) Inventors: Qihao Yang, Guangdong (CN); Mingjin Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 50 days.

(21) Appl. No.: 17/825,692

(22) Filed: May 26, 2022

(65) Prior Publication Data

US 2022/0284928 A1    Sep. 8, 2022

Related U.S. Application Data

(63) Continuation of application No. PCT/CN2020/130920, filed on Nov. 23, 2020.

(30) Foreign Application Priority Data

Nov. 29, 2019    (CN) .......................... 201911204479.X (51) Int. Cl.
  *G11B 27/036*  (2006.01)
  *G06F 3/0488*  (2022.01)
  (Continued)

(52) U.S. Cl.
  CPC .......... *G11B 27/036* (2013.01); *G06F 3/0488* (2013.01); *G11B 27/034* (2013.01); *G11B 27/34* (2013.01); *H04N 23/632* (2023.01)

(58) Field of Classification Search
  CPC ..... G11B 27/036; G11B 27/034; G11B 27/34; H04N 23/632; G06F 3/0488
  See application file for complete search history.

(56) References Cited

U.S. PATENT DOCUMENTS

2011/0243474 A1    10/2011  Ito
2014/0341549 A1*   11/2014  Hattori ................... H04N 19/52
                                                                386/354
(Continued)

FOREIGN PATENT DOCUMENTS

CN    105426035 A    3/2016
CN    105933538 A    9/2016
(Continued)

OTHER PUBLICATIONS

Extended European Search Report Application No. 20893151.9-1208, Dated Dec. 6, 2022, 13 pages.
(Continued)

*Primary Examiner* — Girumsew Wendmagegn
(74) *Attorney, Agent, or Firm* — BROOKS KUSHMAN P.C.

(57) ABSTRACT

A video display method, an electronic device, and a medium are provided. The video display method is applicable to the electronic device and includes: displaying a photographing preview interface of a camera; and displaying, in a case that a target object is included in the photographing preview interface, N video identifiers associated with the target object in the photographing preview interface, where each of the video identifiers indicates one video, and N is a positive integer.

20 Claims, 6 Drawing Sheets

101

Display a photographing preview interface of a camera

102

Display, in a case that a target object is included in the photographing preview interface, N video identifiers associated with the target object in the photographing preview interface, where each of the video identifiers indicates one video, and N is a positive integer (51) Int. Cl.
*G11B 27/034* (2006.01)
*G11B 27/34* (2006.01)
*H04N 23/63* (2023.01)

(56) References Cited

U.S. PATENT DOCUMENTS

| | | | |
|---|---|---|---|
| 2016/0077711 A1 | 3/2016 | Jung et al. | |
| 2016/0232234 A1 | 8/2016 | Baek et al. | |
| 2016/0358631 A1 | 12/2016 | Lee | |
| 2017/0011774 A1* | 1/2017 | Ju | G11B 27/28 |
| 2017/0064207 A1* | 3/2017 | Kim | G06F 16/434 |
| 2018/0152767 A1 | 5/2018 | Liu et al. | |
| 2018/0314698 A1* | 11/2018 | Babushkin | G06F 16/951 |
| 2019/0215448 A1 | 7/2019 | Chun et al. | |

FOREIGN PATENT DOCUMENTS

| | | |
|---|---|---|
| CN | 106162355 A | 11/2016 |
| CN | 106384264 A | 2/2017 |
| CN | 106488002 A | 3/2017 |
| CN | 106658199 A | 5/2017 |
| CN | 107239203 A | 10/2017 |
| CN | 108124167 A | 6/2018 |
| CN | 110121093 A | 8/2019 |
| CN | 110913141 A | 3/2020 |
| JP | 2017182603 A | 10/2017 |
| JP | 2018006961 A | 1/2018 |
| KR | 20120062427 A | 6/2012 |
| KR | 20160031226 A | 3/2016 |
| KR | 20160097870 A | 8/2016 |
| KR | 20180055707 A | 5/2018 |

OTHER PUBLICATIONS

First Office Action for Chinese Application No. 201911204479.X, dated Nov. 30, 2020, 6 Pages.
Second Office Action for Chinese Application No. 201911204479.X, dated Apr. 25, 2021, 6 Pages.
International Search Report and Written Opinion for Application No. PCT/CN2020/130920, dated Feb. 20, 2021, 9 Pages.
First Office Action for Japanese Application No. 2022-524947, dated Jun. 30, 2023, 4 Pages.
First Office Action for Korean Application No. 10-2022-7020704, dated Jan. 15, 2024, 5 Pages.

* cited by examiner

VIDEO DISPLAY METHOD, ELECTRONIC DEVICE AND MEDIUM

CROSS-REFERENCE TO RELATED APPLICATIONS

This application is a continuation of International Application No. PCT/CN2020/130920 filed on Nov. 23, 2020, which claims priority to Chinese Patent Application No. 201911204479.X, filed on Nov. 29, 2019, which are incorporated herein by reference in their entireties.

TECHNICAL FIELD

Embodiments of the present invention relate to the field of video processing, and in particular, to a video display method, an electronic device, and a medium.

BACKGROUND

Currently, during video processing, to obtain a to-be processed video, a user can only shoot the video personally or search videos internally stored on an electronic device for the desired video.

Shooting the video personally spends the user much time. However, to find the desired video from a plurality of videos internally stored on the electronic device, the user also needs to spend a lot of time in searching. In addition, in a case that a plurality of video saving folders internally exist on the electronic device of the user, the user needs to open the folders separately for searching, which is cumbersome and time-consuming.

SUMMARY

Embodiments of the present invention provide a video display method, an electronic device, and a medium.

According to a first aspect, the embodiments of the present invention provide a video display method, applicable to an electronic device, and including:
displaying a photographing preview interface of a camera; and
displaying, in a case that a target object is included in the photographing preview interface, N video identifiers associated with the target object in the photographing preview interface, where each of the video identifiers indicates one video, and N is a positive integer.

According to a second aspect, the embodiments of the present invention further provide an electronic device, including:
a first display module, configured to display a photographing preview interface of a camera; and
a second display module, configured to display, in a case that a target object is included in the photographing preview interface, N video identifiers associated with the target object in the photographing preview interface, where each of the video identifiers indicates one video, and N is a positive integer.

According to a third aspect, the embodiments of the present invention provide an electronic device, including a processor, a memory, and a computer program stored on the memory and executable on the processor, where when executed by the processor, the computer program implements the steps of the video display method as described in the first aspect.

According to a fourth aspect, the embodiments of the present invention provide a computer-readable storage medium, storing a computer program, where when executed by a processor, the computer program implements the steps of the video display method as described in the first aspect.

An embodiment of the present invention provides a video display method, an electronic device, and a computer storage medium. In a case that a photographing preview interface of a camera is displayed, a video identifier associated with a target object included in the photographing preview interface may be displayed, so that subsequently, a user can directly obtain a video indicated by the video identifier. Therefore, in the embodiments of the present invention, the user does not need to shoot a video, nor need to manually search for a desired video, and instead, directly obtains a video identifier of the desired video through a target object in the photographing preview interface of the camera, which features convenient operations and implements quick searching of the video.

BRIEF DESCRIPTION OF THE DRAWINGS

To describe the technical solutions in the embodiments of this application more clearly, the following briefly describes the accompanying drawings required in the embodiments of this application. Apparently, the accompanying drawings in the following description show merely some embodiments of this application, and a person of ordinary skill in the art may derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present invention.

Figure 1:
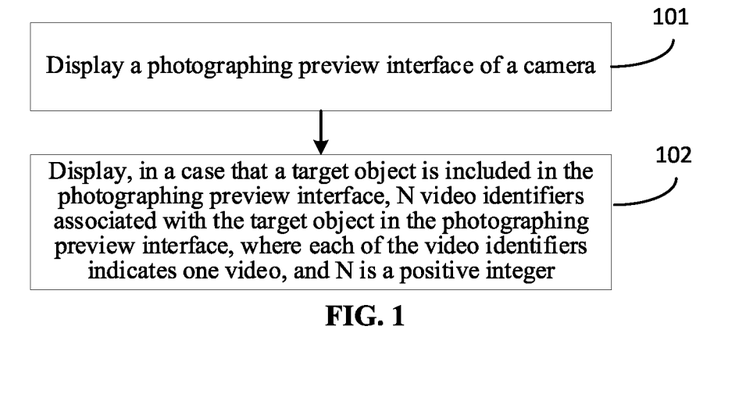
FIG. 1 is a schematic flowchart of a video display method according to an embodiment of the present invention.

FIG. 1 is a schematic flowchart of a video display method according to an embodiment of the present invention. The method is applicable to an electronic device, and the method includes the following steps:

Step 101. Display a photographing preview interface of a camera.

Step 102. Display, in a case that a target object is included in the photographing preview interface, N video identifiers associated with the target object in the photographing preview interface, where each of the video identifiers indicates one video, and N is a positive integer.

The target object may include one or more objects.

In this embodiment, in a case that the photographing preview interface of the camera is displayed, the video identifier associated with the target object included in the photographing preview interface may be displayed, so that subsequently, a user can directly obtain the video indicated by the video identifier. Therefore, in the embodiments of the present invention, the user does not need to shoot a video, nor need to manually search for a desired video, and instead, directly obtains a video identifier of the desired video through a target object in the photographing preview interface of the camera, which features convenient operations and implements quick searching of the video.

In a specific embodiment, after step 101, the method may further include:
receiving a first input performed by a user on at least one object in the photographing preview interface; and
using, in response to the first input, the at least one object selected by the first input as the target object.

That is, in this embodiment, the target object is determined in the photographing preview interface according to a selection of the user. This manner can provide the user with more autonomy and avoid displaying of too many video identifiers from affecting a selection of the user for a video. Certainly, in another embodiment, the electronic device may automatically identify an object that is included in the photographing preview interface and that meets a preset condition as the target object, which is not limited in the present invention.

Further, in a specific implementation, the receiving a first input performed by a user on at least one object in the photographing preview interface includes:
receiving a swipe input performed by the user on the photographing preview interface; and
the using the at least one object selected by the first input as the target object includes:
using at least one object circled by a swipe trajectory of the swipe input as the target object.

Figure 2:
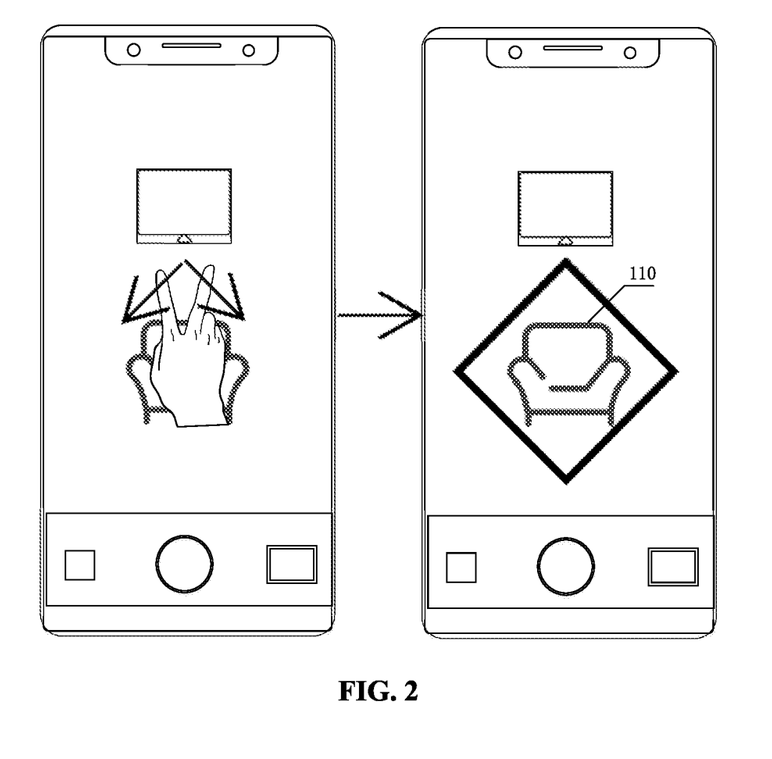
FIG. 2 is a schematic diagram of a swipe input according to an embodiment of the present invention.

That is, in this implementation, a corresponding target object is selected by using a trajectory of an operation gesture of the user. The swipe input herein may be: after putting two fingers together and swiping them down, separating the two fingers and then putting them together. A graphic formed by a swipe trajectory may be a rhombus, a circle, or a graphic that approximates a rhombus or a circle. For example, the user draws a rhombus with fingers that do not leave a screen, and an object circled by the rhombus is used as the target object shown in FIG. 2. FIG. 2 is a schematic diagram of a swipe input according to an embodiment of the present invention. An object 110 in FIG. 2 is a selected target object.

Figure 3:
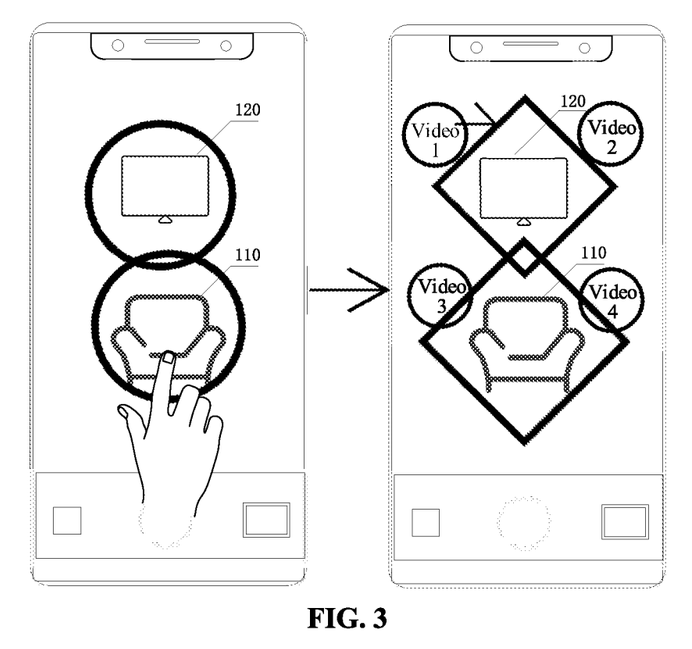
FIG. 3 is a schematic diagram of another swipe input according to an embodiment of the present invention.

In another embodiment, FIG. 3 is a schematic diagram of another swipe input according to an embodiment of the present invention. An object 110 and an object 120 in FIG. 3 are selected target objects. The swipe input may alternatively be that two fingers of a user continuously swipe without leaving the screen, of which a swipe trajectory forms a plurality of continuous graphics, each graphic being a rhombus, a circle, or a graphic that approximates a rhombus or a circle. A plurality of target objects are selected through the swipe input, and the target objects include an object circled by each graphic. For example, if two circles are continuously drawn with fingers that do not leave the screen, and the two circles includes a sofa and a table respectively, the target object includes the sofa and the table, and then video identifiers associated with the sofa and table are simultaneously displayed.

Certainly, the above are only specific embodiments of several types of swipe inputs. In a specific application, the user may alternatively select a target object by using another swipe input on the photographing preview interface. For example, the swipe trajectory is a point, a check mark, or the like, and an object within a predetermined distance above the swipe trajectory is used as the selected target object. Alternatively, the user may click a specific region for focusing, and an object within a focused region is used as a target object.

In addition, in another embodiment, another swipe input may alternatively be used. For example, a target object may be selected by directly clicking, double-clicking, or long-pressing a specific object in the photographing preview interface. Certainly, the foregoing manners of the swipe input are only a few specific examples, and a specific inputting manner of the swipe input is not limited in the present invention.

In an embodiment of the present invention, after step 101 and before step 102, the method may further include obtaining N video identifiers associated with the target object.

Specifically, the obtaining N video identifiers associated with the target object may specifically include:
obtaining the N video identifiers associated with the target object from at least one video stored on a server or a memory of the electronic device.

It should be noted that a video is actually obtained, and the video identifier is only used for being displayed on the photographing preview interface to indicate the video.

In this embodiment, specifically, the video is obtained through a server or a memory of an electronic device. In a case that the memory of the electronic device is selected for obtaining the video, the user can obtain and edit the video without using the Internet. In a case that the server is selected for obtaining the video, a scope of obtaining videos can be broadened, so that abundant video sources are obtained from the Internet.

In an embodiment, the obtaining N video identifiers associated with the target object may further include:
receiving a second input performed by a user;
adjusting, in response to the second input, a photographing field of view of the camera to a target photographing field of view;
determining a target time interval corresponding to the target photographing field of view based on a preset correspondence between a photographing field of view and a time interval; and
obtaining video identifiers of N videos of which photographing times fall within the target time interval and that are associated with the target object.

In this embodiment, a correspondence between a photographing field of view and a time interval is set, so that a photographing time of the obtained video identifier can be limited according to the photographing field of view when the target object is obtained. For example, a time interval corresponding to a standard field of view may be within 3 days, and an actual interval corresponding to a wide angle may be 3 days ago. In this way, the user can select a video with a suitable photographing time as required, and avoid, as much as possible, obtaining too many videos that are not needed by the user, which facilitates subsequent filtering of videos when the user performs checking or editing based on the obtained videos.

In addition, in another embodiment, in step 102, a video identifier associated with each target object may be displayed within a preset range around the target object in the photographing preview interface. As shown in FIG. 3, certainly, the video identifiers may alternatively be displayed in the form of a list, or may be displayed in another manner. A display manner of the video identifier is not limited in the present invention.

In an embodiment, step 102 may include:
displaying, in a case that a first feature part of the target object is included in the photographing preview interface, video identifiers of N videos associated with the first feature part; and
updating, in a case that the photographing preview interface is updated to a second feature part of the target object, the video identifiers of the N videos to video identifiers of T videos associated with the second feature part, where
T is a positive integer, and different feature parts of the target object are associated with different video identifiers.

In this embodiment, some target objects include different feature parts. For example, if a target object is a sofa, feature parts of the sofa may be sofa armrests, a back cushion, a seat cushion, a pillow, and the like. The sofa armrests may be associated with home-related videos, the pillow may be associated with party-related videos, and so on. Therefore, in this embodiment, videos associated with the feature parts of the target object may be obtained, thereby improving the richness of the obtained videos.

The process of identifying a first feature part and a second feature part of the target object in the photographing preview interface may be: sequentially scanning all feature parts of the target object. Specifically, the target object may be scanned in a predetermined sequence (for example, from top to bottom, from left to right, or the like), and feature parts in the scanned parts are identified during the scanning.

In the foregoing embodiments, after scanning of the second feature part is completed, a video identifier associated with the first feature part is not displayed any more, and instead, only a video identifier associated with the second feature part is displayed. Alternatively, after scanning of the second feature part is completed, a video identifier associated with the second feature part is additionally displayed, that is, the video identifiers associated with the first feature part and the second feature part are simultaneously displayed.

In addition, based on the foregoing embodiments, in a case that scanning of a plurality of feature parts of the target object is completed, that is, in a case that the plurality of feature parts of the target object are included in the photographing preview interface, at least two feature parts in a plurality of scanned feature parts may further be combined, and the video identifiers associated with all combinations may be obtained. For example, after scanning of three feature parts is completed, the three feature parts may be combined in pairs and used as a combination, and then video identifiers associated with the four combinations may be obtained. In this way, the richness of the obtained video identifiers may be further increased.

In a specific embodiment, the method may further include:
receiving a third input performed by a user on a first video identifier in the N video identifiers, where the first video identifier may be any one of the N video identifiers;
playing, in response to the third input, a first video corresponding to the first video identifier;
receiving a fourth input performed by the user; and
editing, in response to the fourth input, the first video to output the edited first video.

Because the video usually needs to be played in a process of editing the video, in this embodiment, the first video is first played, and then the first video is edited during playback.

Currently, to perform video editing for a specific target object, the user usually needs to record a video personally, or search for relevant videos on the Internet, which is complex and not convenient enough. However, in this embodiment, after the target object is selected in the photographing preview interface, the relevant videos of the target object may be obtained and then edited. In this way, a process of performing video editing for a specific target object is simplified.

Further, in an embodiment, in a process of playing the first video, a previous video or a next video of the first video may be played in response to a trigger input performed by the user on a Previous or Next button.

In another embodiment, in a case that there are a plurality of first video identifiers, a plurality of first videos corresponding to the plurality of first video identifiers are simultaneously played. During playback of the plurality of first videos, an upper region and a lower region of the screen are divided, where one first video is separately displayed in each region, or a left region and a right region of the screen may be divided, where one first video is separately displayed in each region.

In addition, after the edited first video is obtained, the edited first video may further be saved in response to a received video saving input. The video saving input herein may be an operation of long-pressing a playback button of the video, and certainly, another operation may alternatively be set as the video saving input, which is not limited in the present invention.

Figure 4:
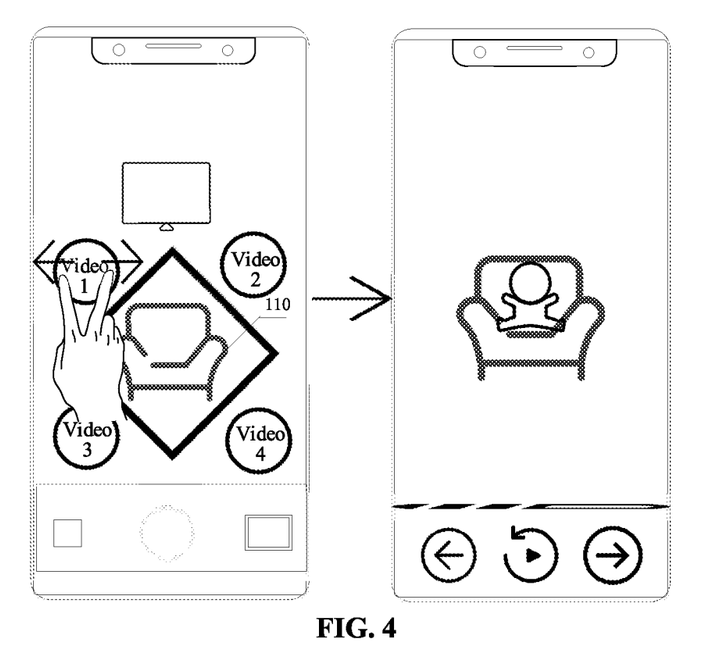
FIG. 4 is a schematic diagram of a third input according to an embodiment of the present invention.

In addition, FIG. 4 is a schematic diagram of a third input according to an embodiment of the present invention. The third input for the first video identifier may be an input operation of clicking the first video identifier, and separating and stretching out two fingers without the fingers leaving the screen. Certainly, in another embodiment, the third input may alternatively be an operation of double-clicking the first video identifier, or another input manner may be set as the third input.

In a specific embodiment, the receiving a fourth input performed by the user may specifically include: receiving the fourth input performed by the user on a playback interface of the first video.

Figure 5:
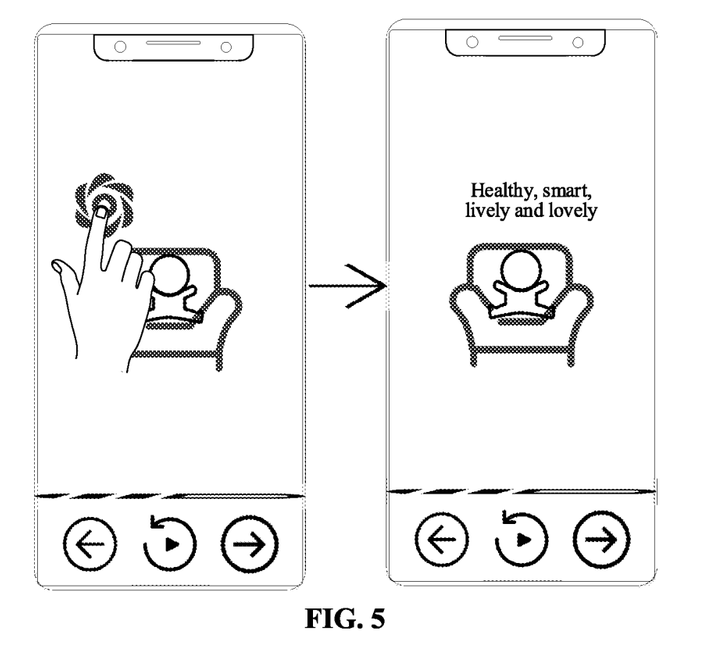
FIG. 5 is a schematic diagram of a fourth input according to an embodiment of the present invention.

FIG. 5 is a schematic diagram of a fourth input according to an embodiment of the present invention. After the receiving a fourth input performed by the user, the method may further include:
displaying, on the playback interface of the first video in response to the fourth input, first information inputted through the fourth input.

In this embodiment, user-defined, inputted first information, such as text and a pattern, may be inserted into the playback interface of the first video. In this way, the user can perform text editing on the obtained first video as required, to obtain a desired video display effect, which improves the flexibility of the user in editing the video.

To facilitate editing by the user and avoid the display content of the first video from being omitted during the editing by the user, the first video may be paused in response to the fourth input, and playback of the first video is resumed in a case that an editing completion input performed by the user is received after the editing is completed.

Specifically, the fourth input may be an operation that the user touches the screen with one finger and moves the finger by a segment of arc that exceeds a preset length. Certainly, the fourth input may alternatively be set to another type of operation, which is not limited in the present invention. After the first information is inserted into the first video, the edited first video is saved, and the edited first information may be viewed when the first video is checked later.

Based on the foregoing embodiments, in a specific embodiment, the receiving a fourth input performed by the user, and editing, in response to the fourth input, the first video to output the edited first video may further include: receiving a fourth input performed by the user on target first information that has been inserted into the first video, and deleting, in response to the fourth input, the target first information in the first video. In this case, the fourth input is a delete input.

Because the user may mistakenly insert information or want to adjust the first information previously inserted, the to-be-adjusted first information needs to be deleted. In this embodiment, the user is enabled to delete the inserted first information, which improves the convenience during information editing of the first video.

Figure 6:
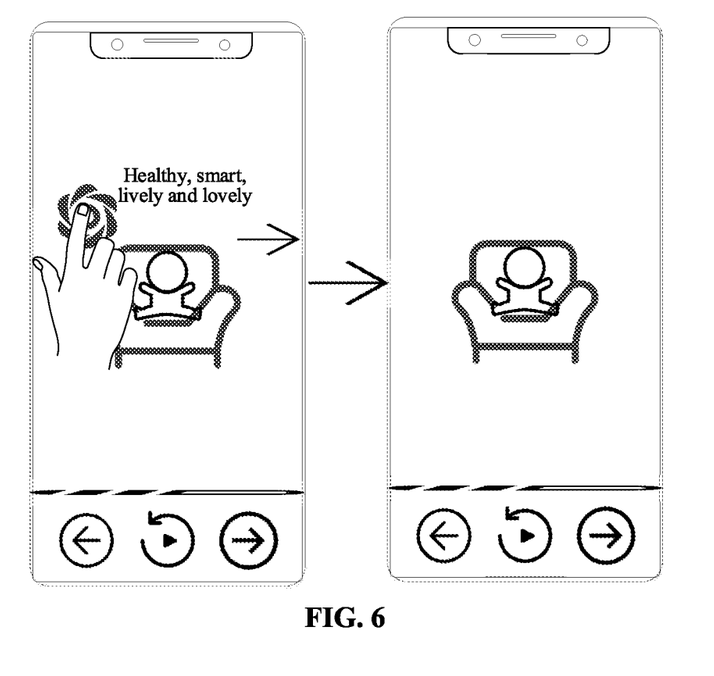
FIG. 6 is a schematic diagram of another fourth input according to an embodiment of the present invention.

Specifically, the fourth input in this embodiment may be an operation that a gesture swipes a line from one side (for example, the left side) of the screen to the other side of the screen. First information through which a swipe trajectory of the user gesture passes is the target first information. FIG. 6 is a schematic diagram of another fourth input according to an embodiment of the present invention. Certainly, in another embodiment, first information inserted above the swipe trajectory of the user gesture may alternatively be used as the target first information. Alternatively, another input manners may be used as the fourth input, which is not limited in the present invention.

In addition, the fourth input for the first information may be performed before the edited first video is saved. Certainly, after the edited first video is saved, the first video may also be continuously called and edited, which is not limited in the present invention.

In another embodiment, the editing, in response to the fourth input, the first video to output the edited first video may further include:
recording, in response to the fourth input, a second video of the target object in the first video; receiving a fifth input performed by the user on the second video; and
inserting, in response to the fifth input, the second video at a first position in the first video, where the first position is a position inputted by the fifth input on a playback progress bar of the first video.

In the foregoing embodiments of the present invention, the associated video identifier is obtained by using a target object in the photographing preview interface, videos corresponding to the video identifier are used as to-be-processed candidate videos, and the user selects at least one video from the to-be-processed candidate videos for editing. In this process, because the to-be-processed candidate videos are recorded by other people or are previously recorded by the user, the to-be-processed candidate video may not meet the current needs. Based on this objective, in this embodiment, a second video of the target object is additionally recorded, and the additionally recorded second video is inserted into the first video. In this way, the video content needed by the user may be arbitrarily added to the first video, to enrich video editing manners of the user, facilitate the user-defined editing on the video, and enhance the flexibility of the video editing. One or more second videos may be recorded.

Figure 7:
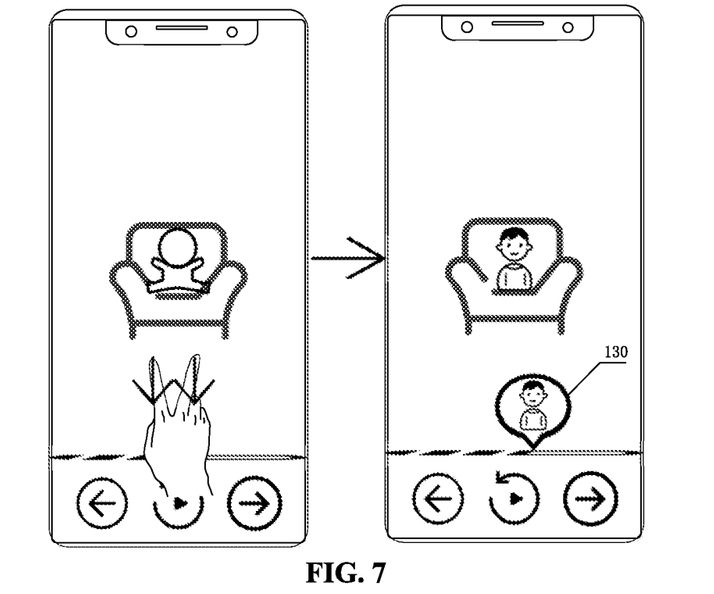
FIG. 7 is a schematic diagram of a fifth input according to an embodiment of the present invention.

Specifically, FIG. 7 is a schematic diagram of a fifth input according to an embodiment of the present invention. The fifth input may be swiping two fingers down within the screen, so that the second video is inserted at a position corresponding to the fifth input on a playback progress bar of the first video, and the indication identifier 130 in FIG. 7 is the indication identifier of the inserted second video. Alternatively, in another embodiment, an operation of swiping one finger down may be used as the fifth input, or a predetermined video insertion menu item may be triggered as the fifth input. The present invention does not limit a specific operation manner of the fifth input.

In a specific embodiment, as shown in FIG. 7, after the inserting the second video at a first position in the first video, the method may further include:
displaying an indication identifier of the second video at the first position on the playback progress bar of the first video, where the indication identifier is used for indicating an insertion position of the second video.

Because the second video inserted into the first video is essentially a video different from the previous first video, their sources, recording scenes, and the like are usually different. In this case, even if a specific second video is inserted during editing of the first video, the second video may need to be adjusted later. Therefore, based on this objective, in this embodiment, an insertion position of the second video is identified on the playback progress bar of the first video, so that the user may intuitively learn of an insertion situation of the second video, and it is convenient for a user to subsequently adjust the second video previously inserted, thereby improving the convenience for the user in a video editing process. The indication identifier herein may be represented by a bubble including a short title of a video, and certainly another identification manner may alternatively be used.

Based on the foregoing embodiments, after the displaying an indication identifier of the second video at the first position on the playback progress bar of the first video, the method may further include:
receiving a sixth input performed by the user on the indication identifier; and
moving, in response to the sixth input, the indication identifier from the first position to a second position, and inserting the second video at the second position in the first video.

The first position and the second position herein refer to positions on the playback progress bar of the first video, that is, positions of a playback time point of the video. The first position and the second position are different.

Because the insertion position of the second video may not be accurately controlled when the second video is inserted, the insertion position may be incorrect. In this case, the insertion position of the inserted second video needs to be adjusted. In this embodiment, an insertion position of the second video in the first video can be moved by moving the position of the indication identifier of the second video on the playback progress bar of the first video. In this process, the user may intuitively check a current moving situation of the insertion position of the second video according to the position of the indication identifier, which helps the user to perform adjustment.

In addition, to avoid the user from missing the playback content of the first video and simplify a backend processing procedure, the playback of the first video is preferably paused in response to the sixth input.

Figure 8:
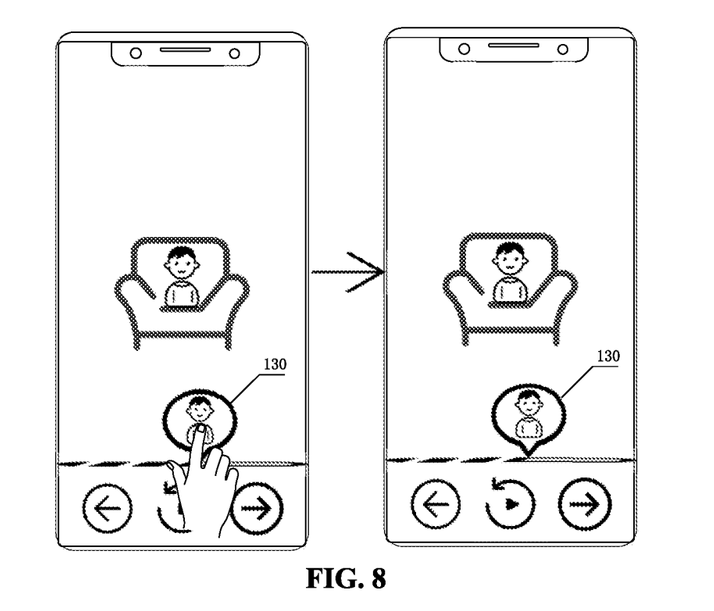
FIG. 8 is a schematic diagram of a sixth input according to an embodiment of the present invention.

Specifically, FIG. 8 is a schematic diagram of a sixth input according to an embodiment of the present invention. The sixth input may be: selecting an indication identifier of the second video with one finger or two fingers, and moving a position of the indication identifier on the playback progress bar of the first video left and right to adjust the insertion position of the second video frame by frame. For example, the user presses the indication identifier with one or two fingers, and swipes the indication identifier left and right without the finger or fingers leaving the screen, to move the insertion position of the second video. The indication identifier 130 in FIG. 8 is the indication identifier of the adjusted second video. For example, the second video is inserted into a previous frame of a current frame through a leftward swipe. In another embodiment, another adjustment manner for the insertion position may alternatively be used. The present invention does not limit the specific operation content of the sixth input.

In an embodiment, after the displaying an indication identifier of the second video at the first position on the playback progress bar of the first video, the method may further include:
receiving a seventh input performed by the user on the indication identifier; and
deleting, in response to the seventh input, the inserted second video from the first video, and eliminating display of the indication identifier.

In this embodiment, the inserted second video can be deleted, to further increases editing manners of the user for an additional video in a process of video editing, so that the user can manage the insertion of the additional video more conveniently, and perform editing more flexibly.

Figure 9:
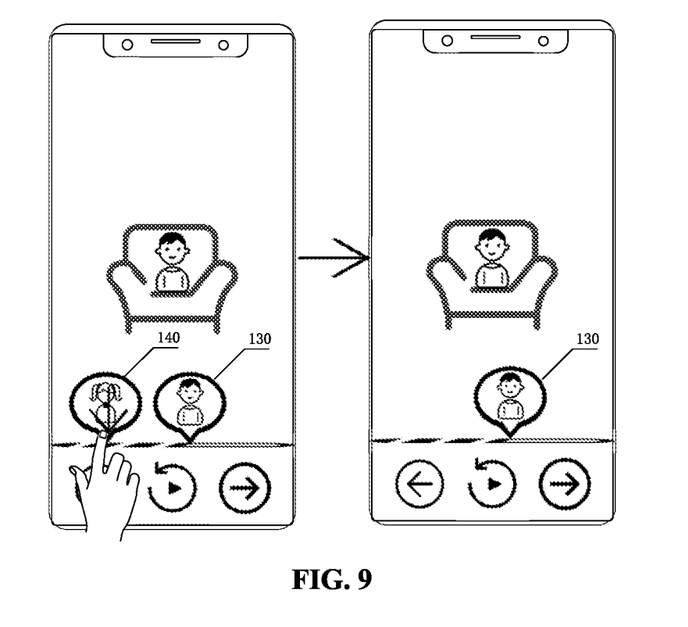
FIG. 9 is a schematic diagram of a seventh input according to an embodiment of the present invention.

Specifically, FIG. 9 is a schematic diagram of a seventh input according to an embodiment of the present invention. The seventh input may be selecting the indication identifier of the second video with one finger, and dragging the indication identifier to move toward a lower edge of the screen without the finger leaving the screen. In another embodiment, a corresponding off identifier may alternatively be set for the indication identifier of the second video. The seventh input is an operation of selecting the off identifier corresponding to the indication identifier of the second video with one finger, and the indication identifier 140 in FIG. 9 is the deleted indication identifier of the second video. Certainly, in another embodiment, the seventh input may alternatively be set to another type of operation.

In an embodiment, after step 102, the method may further include:
receiving an eighth input performed by a user on M target video identifiers in the N video identifiers; and
performing, in response to the eighth input, video concatenation on M target videos indicated by the M target video identifiers to output a third video, where M is an integer greater than 1, and M≤N.

In an embodiment, a plurality of target videos may be directly concatenated. In a case that a single video cannot meet needs of a user, the user does not need to record a video every time, and instead, the user can obtain a desired video by concatenating a plurality of target videos, which improves the flexibility of video editing as well as the richness of video editing operations. The eighth input may be an input operation of dragging M target video identifiers together, and the subsequent video concatenation refers to sequentially stitching the M target videos together based on a time sequence in which the recording is completed. For example, the user may arbitrarily select two video identifiers and drag the two video identifiers together. The two video identifiers respectively correspond to a target video A and a target video B. A recording completion time of A is earlier than a recording completion time of B, and an ending frame of A is connected to a starting frame of B, to stitch a time sequences of recording completion times of A and B together.

Figure 10:
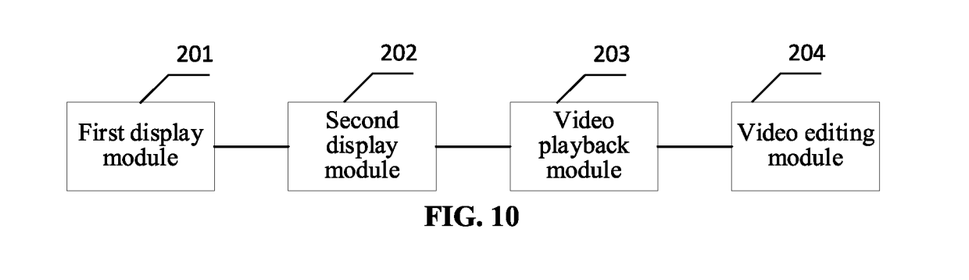
FIG. 10 is a schematic structural diagram of an electronic device according to an embodiment of the present invention.

Another embodiment of the present invention further provides an electronic device. FIG. 10 is a schematic structural diagram of an electronic device according to an embodiment of the present invention. The electronic device includes:
a first display module 201, configured to display a photographing preview interface of a camera; and
a second display module 202, configured to display, in a case that a target object is included in the photographing preview interface, N video identifiers associated with the target object in the photographing preview interface, where each of the video identifiers indicates one video, and N is a positive integer.

In this embodiment, in a case that the photographing preview interface of the camera is displayed, the video identifier associated with the target object included in the photographing preview interface may be displayed, so that subsequently, a user can directly obtain the video indicated by the video identifier. Therefore, in the embodiments of the present invention, the user does not need to shoot a video, nor need to manually search for a desired video, and instead, directly obtains a video identifier of the desired video through a target object in the photographing preview interface of the camera, which features convenient operations and implements quick searching of the video.

In an embodiment, the electronic device may further include:
an object selection module, configured to receive a first input performed by a user on at least one object in the photographing preview interface; and use, in response to the first input, the at least one object selected by the first input as the target object.

That is, in this embodiment, the target object is determined in the photographing preview interface according to a selection of the user. This manner can provide the user with more autonomy and avoid displaying of too many video identifiers from affecting a selection of the user for a video. Certainly, in another embodiment, the electronic device may automatically identify an object that is included in the photographing preview interface and that meets a preset condition as the target object, which is not limited in the present invention.

Further, in a specific implementation, the object selection module is further configured to: receive a swipe input performed by the user on the photographing preview interface; and using at least one object circled by a swipe trajectory of the swipe input as the target object.

That is, in this implementation, a corresponding target object is selected by using a trajectory of an operation gesture of the user. The swipe input herein may be: after putting two fingers together and swiping them down, separating the two fingers and then putting them together. A graphic formed by a swipe trajectory may be a rhombus, a circle, or a graphic that approximates a rhombus or a circle.

The swipe input may alternatively be that two fingers of a user continuously swipe without leaving the screen, of which a swipe trajectory forms a plurality of continuous graphics, each graphic being a rhombus, a circle, or a graphic that approximates a rhombus or a circle. A plurality of target objects are selected through the swipe input, and the target objects include an object circled by each graphic. In addition, in another embodiment, another swipe input may alternatively be used.

In an embodiment, the electronic device may further include:
a video identifier obtaining module, configured to obtain the N video identifiers associated with the target object.

Specifically, the video identifier obtaining module may be further configured to: obtain the N video identifiers associated with the target object from at least one video stored on a server or a memory of the electronic device.

In this embodiment, specifically, the video is obtained through a server or a memory of an electronic device. In a case that the memory of the electronic device is selected for obtaining the video, the user can obtain and edit the video without using the Internet. In a case that the server is selected for obtaining the video, a scope of obtaining videos can be broadened, so that abundant video sources are obtained from the Internet.

In another embodiment, the video identifier obtaining module may further be configured to:
receive a second input performed by the user; adjust, in response to the second input, a photographing field of view of the camera to a target photographing field of view; determine a target time interval corresponding to the target photographing field of view based on a preset correspondence between a photographing field of view and a time interval; and obtain the video identifiers of N videos of which photographing times fall within the target time interval and that are associated with the target object.

In this embodiment, a correspondence between a photographing field of view and a time interval is set, so that a photographing time of the obtained video identifier can be limited according to the photographing field of view when the target object is obtained. In this way, the user can select a video with a suitable photographing time as required, and avoid, as much as possible, obtaining too many videos that are not needed by the user, which facilitates subsequent filtering of videos when the user performs checking or editing based on the obtained videos.

In addition, in another embodiment, the second display module 202 may be further configured to display, in the photographing preview interface, a video identifier associated with each target object within a preset range around the target object, or display the video identifiers in the form of a list. The present invention does not limit the display manner of the video identifier.

In an embodiment, the second display module 202 may specifically include:
a first identifier display unit, configured to display, in a case that a first feature part of the target object is included in the photographing preview interface, video identifiers of N videos associated with the first feature part; and
a second identifier display unit, configured to update, in a case that the photographing preview interface is updated to a second feature part of the target object, the video identifiers of the N videos to video identifiers of T videos associated with the second feature part, where T is a positive integer, and different feature parts of the target object are associated with different video identifiers.

In this embodiment, some target objects include different feature parts. For example, if a target object is a sofa, feature parts of the sofa may be sofa armrests, a back cushion, a seat cushion, a pillow, and the like. Therefore, in this embodiment, videos corresponding to the feature parts of the target object may be obtained, thereby improving the richness of the obtained videos.

The second identifier display unit is further configured to: identify a first feature part and a second feature part of the target object in the photographing preview interface.

In another embodiment, the electronic device further includes:
a video playback module 203, configured to receive a third input performed by a user on a first video identifier in the N video identifiers; and play, in response to the third input, a first video corresponding to the first video identifier; and
a video editing module 204, configured to receive a fourth input performed by the user; and edit, in response to the fourth input, the first video to output the edited first video.

In this embodiment, after the target object is selected in the photographing preview interface, the relevant videos of the target object may be obtained and then edited. In this way, a process of performing video editing for a specific target object is simplified.

In another embodiment, after obtaining the edited first video, the electronic device may further include a video saving module, configured to save the edited first video in response to a received video saving input. The video saving input herein may be an operation of long-pressing a playback button of the video, and certainly, another operation may alternatively be set as the video saving input.

In an embodiment, the video playback module 203 may further be configured to: in a process of playing the first video, play a previous video or a next video of the first video in response to a trigger input performed by the user on a Previous or Next button.

Specifically, the video editing module 204 may be configured to: pause a played video in response to the received fourth input; and receive inputted to-be-inserted information, and insert the to-be-inserted information within a displayed video frame when the playback is paused.

In another embodiment, in a case that there are a plurality of first video identifiers, a plurality of first videos corresponding to the plurality of first video identifiers are simultaneously played. During playback of the plurality of first videos, an upper region and a lower region of the screen are divided, where one first video is separately displayed in each region, or a left region and a right region of the screen may be divided, where one first video is separately displayed in each region.

In a specific embodiment, the video editing module 204 is further configured to: receive the fourth input performed by the user on a playback interface of the first video; and display, on the playback interface of the first video in response to the fourth input, first information inputted through the fourth input.

In this embodiment, user-defined, inputted first information, such as text and a pattern, may be inserted into the playback interface of the first video. In this way, the user can perform text editing on the obtained first video as required, to obtain a desired video display effect, which improves the flexibility of the user in editing the video.

Based on the foregoing embodiments, in a specific embodiment, the video editing module 204 may further be configured to: receive a fourth input performed by the user on target first information that has been inserted into the first video; and delete, in response to the fourth input, the target first information in the first video. In this case, the fourth input is a delete input. In this embodiment, the user is enabled to delete the inserted first information, which improves the convenience during information editing of the first video.

In another embodiment, the video editing module 204 may further be configured to:

record, in response to the fourth input, a second video of the target object in the first video; receive a fifth input performed by the user on the second video; and insert, in response to the fifth input, the second video at a first position in the first video, the first position is a position inputted by the fifth input on a playback progress bar of the first video.

In this embodiment, a second video of the target object is additionally recorded, and the additionally recorded second video is inserted into the first video. In this way, the video content needed by the user may be arbitrarily added to the first video, to enrich video editing manners of the user, facilitate the user-defined editing on the video, and enhance the flexibility of the video editing. One or more second videos may be recorded.

Specifically, the video editing module 204 may further be configured to: display an indication identifier of the second video at the first position on the playback progress bar of the first video, where the indication identifier is used for indicating an insertion position of the second video.

In this embodiment, an insertion position of the second video is identified on the playback progress bar of the first video, so that the user may intuitively learn of an insertion condition of the second video, and it is convenient for a user to subsequently adjust the previously inserted second video, thereby improving the convenience for the user in a video editing process.

In another embodiment, the video editing module 204 may further be configured to:

receive a sixth input performed by the user on the indication identifier; and move, in response to the sixth input, the indication identifier from the first position to a second position, and insert the second video at the second position in the first video.

In this embodiment, an insertion position of the second video in the first video can be moved by moving the position of the indication identifier of the second video on the playback progress bar of the first video. In this process, the user may intuitively check a current moving situation of the insertion position of the second video according to the position of the indication identifier, which helps the user to perform adjustment.

In another embodiment, the video editing module 204 may further be configured to:

receive a seventh input performed by the user on the indication identifier; and delete, in response to the seventh input, the inserted second video from the first video, and eliminate display of the indication identifier.

In this embodiment, editing manners of the user for an additional video in a process of video editing are further increased, so that the user can manage the insertion of the additional video more conveniently, and perform editing more flexibly.

In another embodiment, the electronic device further includes:

a video concatenation module, configured to receive an eighth input performed by a user on M target video identifiers in the N video identifiers; and perform, in response to the eighth input, video concatenation on M target videos indicated by the M target video identifiers to output a third video, M is an integer greater than 1, and M≤N.

In an embodiment, a plurality of target videos may be directly concatenated. In a case that a single video cannot meet needs of a user, the user does not need to record a video every time, and instead, the user can obtain a desired video by concatenating a plurality of target videos, which improves the flexibility of video editing as well as the richness of video editing operations.

The electronic device provided in the embodiments of the present invention can implement the steps of the method implemented by the electronic device in any of the foregoing method embodiments. To avoid repetition, details are not described herein again.

Figure 11:
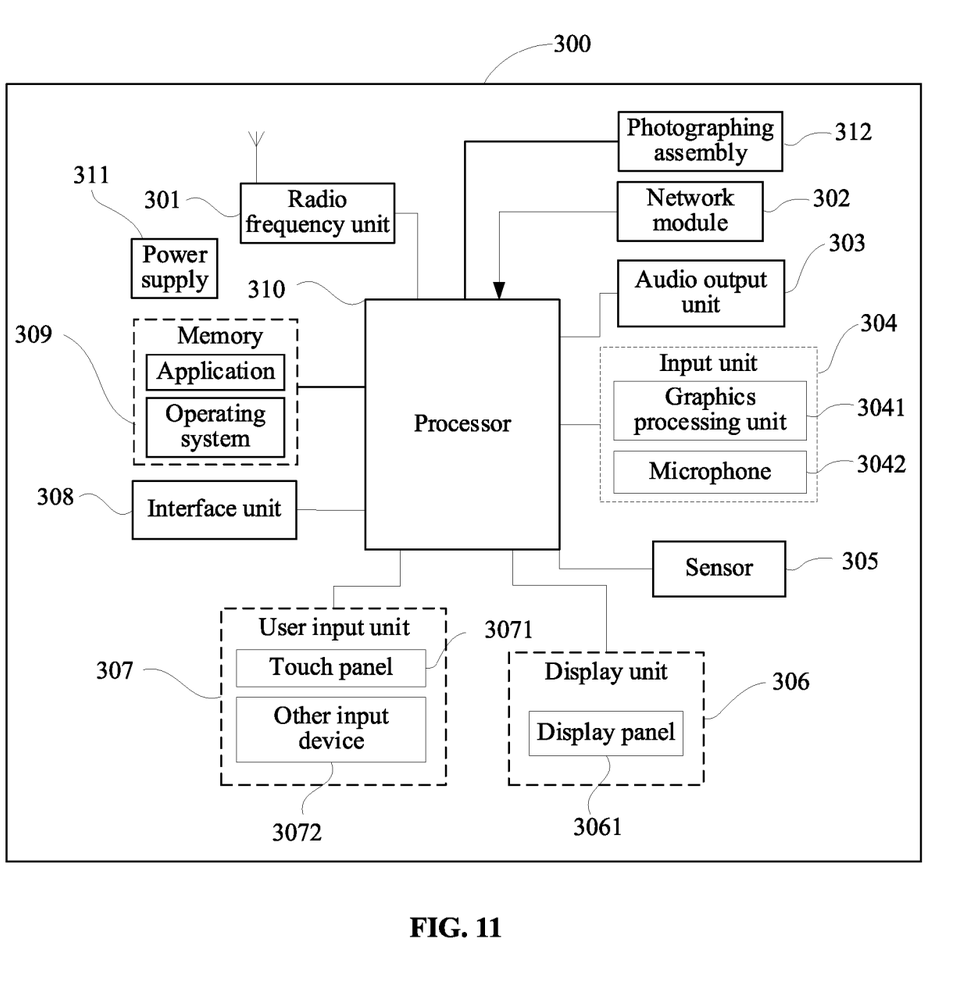
FIG. 11 is a schematic diagram of a hardware structure of an electronic device according to an embodiment of the present invention.

FIG. 11 is a schematic diagram of a hardware structure of an electronic device 300 for implementing various embodiments of the present invention.

The electronic device 300 includes, but is not limited to, components such as a radio frequency unit 301, a network module 302, an audio output unit 303, an input unit 304, a sensor 305, a display unit 306, a user input unit 307, an interface unit 308, a memory 309, a processor 310, a power supply 311 and a photographing assembly 312. A person skilled in the art may understand that the electronic device structure shown in FIG. 11 does not constitute a limitation to the electronic device. The electronic device may include more or fewer components than those shown in the figure, or some components may be combined, or a different component deployment may be used. In this embodiment of the present invention, the electronic device includes, but is not limited to, a mobile phone, a tablet computer, a notebook computer, a palmtop computer, an in-vehicle terminal, a wearable device, a pedometer, and the like. The photographing assembly 312 may include a camera and related components of the camera, or the like.

The processor 310 is configured to display a photographing preview interface of a camera; and display, in a case that a target object is included in the photographing preview interface, N video identifiers associated with the target object in the photographing preview interface, where each of the video identifiers indicates one video, and N is a positive integer.

In this embodiment of the present invention, in a case that the photographing preview interface of the camera is displayed, the video identifier associated with the target object included in the photographing preview interface may be displayed, so that subsequently, a user can directly obtain the video indicated by the video identifier. Therefore, in the embodiments of the present invention, the user does not need to shoot a video, nor need to manually search for a desired video, and instead, directly obtains a video identifier of the desired video through a target object in the photographing preview interface of the camera, which features convenient operations and implements quick searching of the video.

It should be understood that, in this embodiment of the present invention, the radio frequency unit 301 may be configured to receive and transmit information or receive and transmit a signal during a call, specifically, after downlink data from a base station is received, the downlink data is sent to the processor 310 for processing; and in addition, uplink data is sent to the base station. Generally, the radio frequency unit 301 includes, but is not limited to, an antenna, at least one amplifier, a transceiver, a coupler, a low noise amplifier, a duplexer, and the like. In addition, the radio frequency unit 301 may further communicate with the network and another device through wireless communication system.

The electronic device provides wireless broadband Internet access for a user by using the network module 302, for example, helps the user to send and receive an email, browse a webpage, and access stream media, and the like.

The audio output unit 303 may convert audio data received by the radio frequency unit 301 or the network module 302 or stored on the memory 309 into audio signals and output the audio signals as sounds. In addition, the audio output unit 303 may further provide an audio output that is related to a particular function executed by the electronic device 300 (for example, a call signal receiving sound or a message receiving sound). The audio output unit 303 includes a speaker, a buzzer, a receiver, and the like.

An input unit 304 is configured to receive an audio signal or a video signal. The input unit 304 may include a graphics processing unit (GPU) 3041 and a microphone 3042. The GPU 13041 processes image data of a static picture or a video acquired by an image capturing device (for example, a camera) in a video capturing mode or an image capturing mode. An image frame that has been processed may be displayed on a display unit 306. The image frame processed by the GPU 13041 may be stored on the memory 309 (or another storage medium) or sent through the radio frequency unit 301 or the network module 302. The microphone 3042 can receive sound and can process such sound into audio data. The processed audio data may be transferred, in a phone talk mode, to a format that may be sent to a mobile communication base station via the radio frequency unit 301 to output.

The electronic device 300 may further include at least one sensor 305, such as an optical sensor, a motion sensor, and other sensors. Specifically, the optical sensor includes an ambient light sensor and a proximity sensor, where the ambient light sensor may adjust luminance of the display panel 3061 according to the luminance of the ambient light, and the proximity sensor may switch off the display panel 3061 and/or backlight when the electronic device 300 is moved to the ear. As one type of motion sensor, an acceleration sensor may detect magnitude of accelerations in various directions (which generally are triaxial), may detect magnitude and a direction of the gravity when static, and may be configured to identify an electronic device attitude (such as switchover between horizontal and vertical screens, a related game, and attitude calibration of a magnetometer), a related function of vibration identification (such as a pedometer and a knock); and the sensor 305 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 306 may be configured to display information input by the user or information provided for the user. The display unit 306 may include a display panel 3061. The display panel 3061 may be configured by using a liquid crystal display (Liquid Crystal Display, LCD), an organic light-emitting diode (Organic Light-Emitting Diode, OLED), or the like.

A user input unit 307 may be configured to: receive input numeral or character information, and generate a key signal input related to a user setting and function control of the electronic device. Specifically, the user input unit 307 includes a touch panel 3071 and another input device 3072. The touch panel 3071, also referred to as a touchscreen, may collect a touch operation of a user on or near the touch panel (such as an operation of a user on or near the touch panel 3071 by using any suitable object or attachment, such as a finger or a stylus). The touch panel 3071 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 310. Moreover, the touch controller may receive and execute a command transmitted from the processor 310. In addition, the touch panel 3071 may be implemented by using various types, such as a resistive type, a capacitance type, an infrared type, and a surface acoustic wave type. In addition to the touch panel 3071, the user input unit 307 may further include the another input device 3072. Specifically, the another input device 3072 may include, but is not limited to, a physical keyboard, a functional key (such as a volume control key or a switch key), a track ball, a mouse, and a joystick, which are not described herein in detail.

Further, the touch panel 3071 may cover the display panel 3061. After detecting a touch operation on or near the touch panel 3071, the touch panel transfers the touch operation to the processor 310, to determine a type of a touch event. Then, the processor 310 provides a corresponding visual output on the display panel 3061 according to the type of the touch event. Although, in FIG. 11, the touch panel 3071 and the display panel 3061 are used as two separate parts to implement input and output functions of the electronic device, in some embodiments, the touch panel 3071 and the display panel 3061 may be integrated to implement the input and output functions of the electronic device, which are not limited herein.

The interface unit 308 is an interface for connecting an external apparatus to the electronic device 300. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 308 may be configured to receive an input (such as data information or electric power) from an external apparatus and transmit the received input to one or more elements in the electronic device 300 or may be configured to transmit data between the electronic device 300 and an external apparatus.

The memory 309 may be configured to store a software program and various data. The memory 309 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 309 may include a high speed random access memory, and may also include a non-volatile memory, such as at least one magnetic disk storage device, a flash memory, or another volatile solid-state storage device.

The processor 310 is a control center of the electronic device, and connects various parts of the entire electronic device by using various interfaces and lines. By running or executing the software program and/or module stored in the memory 309, and invoking data stored in the memory 309, the processor 310 performs various functions of the electronic device and processes data, thereby performing overall monitoring on the electronic device. The processor 310 may include one or more processing units; and optionally, the processor 310 may integrate an application processor and a modem processor. The application processor mainly processes an operating system, a user interface, an application program, and the like. The modem processor mainly processes wireless communication. It may be understood that the foregoing modem may either not be integrated into the processor 310.

The electronic device 300 may further include the power supply 311 (such as a battery) for supplying power to the components. Preferably, the power supply 311 may logically connect to the processor 310 by using a power supply management system, thereby implementing functions, such as charging, discharging, and power consumption management, by using the power supply management system.

In addition, the electronic device 300 includes some unshown functional modules, which is not repeated herein.

Preferably, the embodiments of the present invention further provide an electronic device, including a processor 310, a memory 309, and a computer program on the memory 309 and executed on the processor 310, where when executed by the processor 310, the computer program implements the processes of the embodiment of the video display method, and can achieve the same technical effects. To avoid repetition, details are not described herein again.

The embodiments of the present invention further provide a computer-readable storage medium, storing a computer program, where when executed by a processor, the computer program implements the processes of the embodiment of the video display method, and can achieve the same technical effects. To avoid repetition, details are not described herein again.

The computer-readable storage medium may include a non-transitory memory, for example, a read-only memory (Read-Only Memory, ROM), a random access memory (Random Access Memory, RAM), a magnetic disk, or an optical disc.

It should be noted that the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

Aspects of the present invention are described above with reference to flowchart illustrations and/or block diagrams of methods, apparatuses (systems) and machine program products according to embodiments of the present invention. It should be understood that each block of the flowchart illustrations and/or block diagrams, and combinations of blocks in the flowchart illustrations and/or block diagrams, can be implemented by programs or instructions. These programs or instructions may be provided to a processor of a general-purpose computer, special-purpose computer, or other programmable data processing apparatus, to generate a machine, such that these programs or instructions, which are executed via the processor of the computer or other programmable data processing apparatus, enable the implementation of implementing the functions/acts specified in one or more blocks of the flowcharts and/or block diagrams. Such a processor may be, but not limited to, a general-purpose processor, a special-purpose processor, an application-specific processor or a field-programmable logic circuit. It should be further noted that, each box in a block diagram and/or a flowchart and a combination of boxes in the block diagram and/or the flowchart may be implemented by using a dedicated hardware configured to perform a specified function or action, or may be implemented by using a combination of dedicated hardware and a computer instruction.

The embodiments of the present invention are described above with reference to the accompanying drawings, but the present invention is not limited to the foregoing specific embodiments, which are merely illustrative rather than limited. Under the inspiration of the present invention, a person of ordinary skill in the art can make many forms without departing from the scope of the present invention and the protection of the claims, all of which fall within the protection of the present invention.

What is claimed is:

1. A video display method, applicable to an electronic device, the method comprising:
displaying a photographing preview interface of a camera; and
displaying, in a case that a target object is comprised in the photographing preview interface, N video identifiers associated with the target object in the photographing preview interface, wherein each of the video identifiers indicates one video, and N is a positive integer;
wherein the displaying, in a case that a target object is comprised in the photographing preview interface, N video identifiers associated with the target object in the photographing preview interface comprises:
displaying, in a case that a first feature part of the target object is comprised in the photographing preview interface, video identifiers of N videos associated with the first feature part; and
updating, in a case that the photographing preview interface is updated to a second feature part of the target object, the video identifiers of the N videos to video identifiers of T videos associated with the second feature part, wherein
T is a positive integer, and different feature parts of the target object are associated with different video identifiers.

2. The method according to claim 1, wherein after the displaying a photographing preview interface of a camera, the method further comprises:
receiving a first input performed by a user on at least one object in the photographing preview interface; and
using, in response to the first input, the at least one object selected by the first input as the target object.

3. The method according to claim 2, wherein the receiving a first input performed by a user on at least one object in the photographing preview interface comprises:
receiving a swipe input performed by the user on the photographing preview interface; and
the using the at least one object selected by the first input as the target object comprises:
using at least one object circled by a swipe trajectory of the swipe input as the target object.

4. The method according to claim 1, wherein before the displaying N video identifiers associated with the target object in the photographing preview interface, the method further comprises:
receiving a second input performed by a user;
adjusting, in response to the second input, a photographing field of view of the camera to a target photographing field of view;

determining a target time interval corresponding to the target photographing field of view based on a preset correspondence between a photographing field of view and a time interval; and obtaining video identifiers of N videos of which photographing times fall within the target time interval and that are associated with the target object.

5. The method according to claim 1, further comprising:
receiving a third input performed by a user on a first video identifier in the N video identifiers;
playing, in response to the third input, a first video corresponding to the first video identifier;
receiving a fourth input performed by the user; and
editing, in response to the fourth input, the first video to output the edited first video.

6. The method according to claim 5, wherein the receiving a fourth input performed by the user comprises:
receiving the fourth input performed by the user on a playback interface of the first video; and
after the receiving a fourth input performed by the user, the method further comprises:
displaying, on the playback interface of the first video in response to the fourth input, first information inputted through the fourth input.

7. The method according to claim 5, wherein the editing, in response to the fourth input, the first video to output the edited first video further comprises:
recording, in response to the fourth input, a second video of the target object in the first video;
receiving a fifth input performed by the user on the second video; and
inserting, in response to the fifth input, the second video at a first position in the first video, wherein
the first position is a position inputted by the fifth input on a playback progress bar of the first video.

8. The method according to claim 7, wherein after the inserting the second video at a first position in the first video, the method further comprises:
displaying an indication identifier of the second video at the first position on the playback progress bar of the first video, wherein
the indication identifier is used for indicating an insertion position of the second video.

9. The method according to claim 8, wherein after the displaying an indication identifier of the second video at the first position on the playback progress bar of the first video, the method further comprises:
receiving a sixth input performed by the user on the indication identifier; and
moving, in response to the sixth input, the indication identifier from the first position to a second position, and inserting the second video at the second position in the first video.

10. The method according to claim 8, wherein after the displaying an indication identifier of the second video at the first position on the playback progress bar of the first video, the method further comprises:
receiving a seventh input performed by the user on the indication identifier; and
deleting, in response to the seventh input, the inserted second video from the first video, and eliminating display of the indication identifier.

11. The method according to claim 1, wherein after the displaying N video identifiers associated with the target object in the photographing preview interface, the method further comprises:

receiving an eighth input performed by a user on M target video identifiers in the N video identifiers; and
performing, in response to the eighth input, video concatenation on M target videos indicated by the M target video identifiers to output a third video, wherein
M is an integer greater than 1, and M≤N.

12. An electronic device, comprising a processor, a memory, and a computer program stored on the memory and executable on the processor, wherein the computer program, when executed by the processor, causes the electronic device to implement:
displaying a photographing preview interface of a camera; and
displaying, in a case that a target object is comprised in the photographing preview interface, N video identifiers associated with the target object in the photographing preview interface, wherein each of the video identifiers indicates one video, and N is a positive integer;
wherein the displaying, in a case that a target object is comprised in the photographing preview interface, N video identifiers associated with the target object in the photographing preview interface comprises:
displaying, in a case that a first feature part of the target object is comprised in the photographing preview interface, video identifiers of N videos associated with the first feature part; and
updating, in a case that the photographing preview interface is updated to a second feature part of the target object, the video identifiers of the N videos to video identifiers of T videos associated with the second feature part, wherein
T is a positive integer, and different feature parts of the target object are associated with different video identifiers.

13. The electronic device according to claim 12, wherein after the displaying a photographing preview interface of a camera, wherein the computer program, when executed by the processor, further causes the electronic device to implement:
receiving a first input performed by a user on at least one object in the photographing preview interface; and
using, in response to the first input, the at least one object selected by the first input as the target object.

14. The electronic device according to claim 13, when receiving a first input performed by a user on at least one object in the photographing preview interface, the computer program, when executed by the processor, further causes the electronic device to implement:
receiving a swipe input performed by the user on the photographing preview interface; and
the using the at least one object selected by the first input as the target object comprises:
using at least one object circled by a swipe trajectory of the swipe input as the target object.

15. The electronic device according to claim 12, wherein before the displaying N video identifiers associated with the target object in the photographing preview interface, the computer program, when executed by the processor, further causes the electronic device to implement:
receiving a second input performed by a user;
adjusting, in response to the second input, a photographing field of view of the camera to a target photographing field of view;
determining a target time interval corresponding to the target photographing field of view based on a preset correspondence between a photographing field of view and a time interval; and obtaining video identifiers of N videos of which photographing times fall within the target time interval and that are associated with the target object.

16. The electronic device according to claim 12, wherein the computer program, when executed by the processor, further causes the electronic device to implement:
receiving a third input performed by a user on a first video identifier in the N video identifiers;
playing, in response to the third input, a first video corresponding to the first video identifier;
receiving a fourth input performed by the user; and
editing, in response to the fourth input, the first video to output the edited first video.

17. The electronic device according to claim 16, wherein the editing, in response to the fourth input, the first video to output the edited first video further comprises:
recording, in response to the fourth input, a second video of the target object in the first video;
receiving a fifth input performed by the user on the second video; and
inserting, in response to the fifth input, the second video at a first position in the first video, wherein
the first position is a position inputted by the fifth input on a playback progress bar of the first video.

18. A non-transitory computer-readable storage medium, storing a computer program, when executed by a processor, causing the non-transitory computer-readable storage medium to implement:
displaying a photographing preview interface of a camera; and
displaying, in a case that a target object is comprised in the photographing preview interface, N video identifiers associated with the target object in the photographing preview interface, wherein each of the video identifiers indicates one video, and N is a positive integer;
wherein the displaying, in a case that a target object is comprised in the photographing preview interface, N video identifiers associated with the target object in the photographing preview interface comprises:
displaying, in a case that a first feature part of the target object is comprised in the photographing preview interface, video identifiers of N videos associated with the first feature part; and
updating, in a case that the photographing preview interface is updated to a second feature part of the target object, the video identifiers of the N videos to video identifiers of T videos associated with the second feature part, wherein
T is a positive integer, and different feature parts of the target object are associated with different video identifiers.

19. The non-transitory computer-readable storage medium according to claim 18, wherein after the displaying a photographing preview interface of a camera, the computer program, when executed by a processor, further causes the non-transitory computer-readable storage medium to implement:
receiving a first input performed by a user on at least one object in the photographing preview interface; and
using, in response to the first input, the at least one object selected by the first input as the target object.

20. The non-transitory computer-readable storage medium according to claim 19, when receiving a first input performed by a user on at least one object in the photographing preview interface, the computer program, when executed by a processor, further causes the non-transitory computer-readable storage medium to implement:
receiving a swipe input performed by the user on the photographing preview interface; and
the using the at least one object selected by the first input as the target object comprises:
using at least one object circled by a swipe trajectory of the swipe input as the target object.

* * * * *